US012683270B1

(12) United States Patent
Clark et al.

(10) Patent No.: US 12,683,270 B1
(45) Date of Patent: Jul. 14, 2026

(54) AIRCRAFT MOUNTABLE ANTENNA SYSTEM WITH LARGE FIELD OF VIEW

(71) Applicant: Resonant Sciences, LLC, Beavercreek, OH (US)

(72) Inventors: Randall T Clark, Xenia, OH (US); Daniel Stammen, Troy, OH (US)

(73) Assignee: RESONANT SCIENCES, LLC, Beavercreek, OH (US)

( * ) Notice: Subject to any disclaimer, the term of this patent is extended or adjusted under 35 U.S.C. 154(b) by 389 days.

(21) Appl. No.: 18/209,240

(22) Filed: Jun. 13, 2023

Related U.S. Application Data

(60) Provisional application No. 63/351,976, filed on Jun. 14, 2022.

(51) Int. Cl.
*H01Q 1/28* (2006.01)
*H01Q 3/26* (2006.01)
*H01Q 9/04* (2006.01)

(52) U.S. Cl.
CPC ................. *H01Q 1/28* (2013.01); *H01Q 3/26* (2013.01); *H01Q 9/0407* (2013.01)

(58) Field of Classification Search
CPC ........... H01Q 1/28; H01Q 3/26; H01Q 9/0407
See application file for complete search history.

(56) References Cited

U.S. PATENT DOCUMENTS 4,035,734 A 7/1977 Flormann et al.
4,327,438 A 4/1982 Baier et al.
4,475,246 A 10/1984 Batlivala et al.
5,481,572 A 1/1996 Skold et al.
5,912,644 A 6/1999 Wang
5,963,847 A 10/1999 Ito et al.
6,912,644 B1 6/2005 O'Connor et al.
7,555,219 B2 6/2009 Cox et al.
7,633,435 B2 12/2009 Meharry et al.
7,756,002 B2 7/2010 Batra et al.
8,135,339 B2 3/2012 Ranson et al.
8,285,201 B2 10/2012 Gore et al.
8,503,926 B2 8/2013 Gainey et al.
8,571,470 B2 10/2013 Ranson et al.
8,630,211 B2 1/2014 Gainey et al.
8,725,067 B2 5/2014 Ahn et al.
8,755,750 B2 6/2014 Cox et al.
8,868,006 B2 10/2014 Cox et al.
(Continued)

FOREIGN PATENT DOCUMENTS

EP 2868004 B1 2/2018
WO 2013062547 A1 5/2013

OTHER PUBLICATIONS

U.S. Appl. No. 17/358,997, filed Jun. 25, 2021, Al Saulnier.
(Continued)

*Primary Examiner* — Awat M Salih
(74) *Attorney, Agent, or Firm* — GrayRobinson, P.A.

(57) ABSTRACT

An antenna system includes an antenna housing that can be mounted on an exterior fuselage of an aircraft. A radio antenna carried by the antenna housing can communicate with radio devices within a field of view of the radio antenna when mounted on the exterior fuselage. A radio sensor carried by the antenna housing can communicate with radio devices outside the field of view of the radio antenna through an electrically conductive portion of the exterior fuselage.

19 Claims, 6 Drawing Sheets

(56) References Cited

U.S. PATENT DOCUMENTS

| | | | |
|---|---|---|---|
| 8,879,433 B2 | 11/2014 | Khojastepour et al. | |
| 9,209,840 B2 | 12/2015 | Cox | |
| 9,461,698 B2 | 10/2016 | Moffatt et al. | |
| 10,218,490 B1 | 2/2019 | Yang et al. | |
| 11,057,067 B1 | 7/2021 | Hickle et al. | |
| 11,121,473 B2 | 9/2021 | Chapman et al. | |
| 11,271,319 B2 * | 3/2022 | Celik | H01Q 1/38 |
| 11,362,694 B1 | 6/2022 | Laufer et al. | |
| 11,405,171 B2 | 8/2022 | Khude et al. | |
| 11,646,505 B2 * | 5/2023 | Adachi | H01Q 21/20 343/893 |
| 2001/0029186 A1 | 10/2001 | Canyon et al. | |
| 2004/0032904 A1 | 2/2004 | Orlik et al. | |
| 2006/0251148 A1 | 11/2006 | Welborn et al. | |
| 2006/0270470 A1 * | 11/2006 | de La Chapelle | B64D 45/0059 455/575.5 |
| 2007/0132642 A1 * | 6/2007 | Iluz | H01Q 21/065 343/700 MS |
| 2009/0175365 A1 | 7/2009 | Jun | |
| 2011/0007852 A1 | 1/2011 | Kimata | |
| 2011/0170473 A1 | 7/2011 | Proctor, Jr. et al. | |
| 2011/0286605 A1 | 11/2011 | Furuta et al. | |
| 2012/0170482 A1 | 7/2012 | Hwang et al. | |
| 2012/0213312 A1 | 8/2012 | Futatsugi et al. | |
| 2013/0244710 A1 | 9/2013 | Nguyen et al. | |
| 2013/0314271 A1 | 11/2013 | Braswell et al. | |
| 2014/0194054 A1 | 7/2014 | Kim | |
| 2014/0204808 A1 | 7/2014 | Choi et al. | |
| 2015/0130671 A1 * | 5/2015 | Cordone | H01Q 5/30 343/705 |
| 2015/0269449 A1 | 9/2015 | Kosaki | |
| 2015/0270865 A1 | 9/2015 | Polydoros et al. | |
| 2015/0326380 A1 | 11/2015 | Verbin et al. | |
| 2016/0254007 A1 | 9/2016 | Guo et al. | |
| 2017/0257868 A1 | 9/2017 | Wang et al. | |
| 2017/0280351 A1 | 9/2017 | Skaaksrud | |
| 2018/0076847 A1 | 3/2018 | Ju et al. | |
| 2019/0097707 A1 | 3/2019 | Cox et al. | |
| 2019/0207738 A1 | 7/2019 | Son et al. | |
| 2019/0274030 A1 | 9/2019 | Bidot et al. | |
| 2019/0310681 A1 | 10/2019 | Shainwald et al. | |
| 2020/0053835 A1 | 2/2020 | Ye et al. | |
| 2020/0099504 A1 | 3/2020 | Erricolo et al. | |
| 2020/0245363 A1 | 7/2020 | Kim et al. | |
| 2020/0252115 A1 | 8/2020 | Paramesh et al. | |
| 2020/0252806 A1 | 8/2020 | Yerramalli et al. | |
| 2021/0028897 A1 | 1/2021 | Park et al. | |
| 2021/0273773 A1 | 9/2021 | Yi et al. | |
| 2021/0274381 A1 | 9/2021 | Teyeb | |
| 2021/0377912 A1 | 12/2021 | Hamss et al. | |
| 2022/0094512 A1 | 3/2022 | Kolodziej | |
| 2022/0150730 A1 | 5/2022 | Freda et al. | |
| 2022/0159674 A1 | 5/2022 | Deng et al. | |

OTHER PUBLICATIONS

Carusone et al.; " Analogue Adoptive Filters: Past and Present"; IEE Proc., Circuits Devices System; vol. 147, No. 1; Feb. 2000.

Nawankwo et al.; "A Survey of Self-Interference Management Techniques For Single Frequency Full Duplex Systems"; IEEE Access; vol. 6; pp. 30242-30268; 2018.

Office Action of Oct. 28, 2022 for U.S. Appl. No. 17/358,997.

Office Action of Dec. 7, 2022 for U.S. Appl. No. 17/358,939.

* cited by examiner

AIRCRAFT MOUNTABLE ANTENNA SYSTEM WITH LARGE FIELD OF VIEW

CROSS-REFERENCE TO RELATED APPLICATION

This claims the benefit of priority to Application No. 63/351,976, filed Jun. 14, 2022, which is incorporated by reference in its entirety.

BACKGROUND

Conventional conformal aircraft antennae that are mounted on top of the aircraft's fuselage are designed to receive radio signals from radio transmitters located above the aircraft, such as transmitters located on satellites in orbit. The angle ranges over which these antennae are able to receive transmissions from such transmitters is called a "field of view" or "FoV." Because these top-mounted antennae are designed to look up into the sky, their FoV is oriented vertically from the fuselage. This can be a problem when the aircraft banks and redirects the FoV out of range of a transmission. Additionally, an antenna with a vertical FoV atop an aircraft fuselage will not detect radio transmissions that originate along the horizon or from an Earth-based transmitter.

BRIEF SUMMARY

The antenna system described herein overcomes these drawbacks by being mountable on an aircraft fuselage and having a large FoV that gives the antenna system the ability to communicate with satellites, horizon-based, and/or Earth-based radio devices.

An example of such a device has an antenna system including an antenna housing that can be mounted on an exterior fuselage of an aircraft. A radio antenna carried by the antenna housing can communicate with radio devices within a field of view of the radio antenna when mounted on the exterior fuselage. A radio sensor carried by the antenna housing can communicate with radio devices outside the field of view of the radio antenna through an electrically conductive portion of the exterior fuselage.

This device may also include one or more of the features now described.

The radio antenna may be a cavity-backed patch antenna.

The radio sensor may include an antenna array with radio sensor antennae arranged circumferentially about the radio antenna.

The radio antenna and radio sensor may be in a common resonant cavity in the antenna housing.

The antenna housing may include a first resonant cavity and a second resonant cavity. The radio antenna may be located in the first resonant cavity and the second resonant cavity. The radio sensor may be located in the first resonant cavity.

The device may also include an aircraft having the antenna housing mounted on the exterior fuselage thereof in such a way that the field of view of the radio antenna is above the aircraft and the field of view of the radio sensor is to left and right sides and/or below the aircraft.

The radio sensor may include an antenna array with radio sensor antennae arranged circumferentially about the radio antenna and the device may also include a signal conditioner that can perform beam forming of the antenna array.

An example of a method includes receiving, by a radio antenna on an exterior fuselage of an aircraft, a first radio signal transmitted from above the aircraft; and receiving, by a radio sensor adjacent the radio antenna on the exterior fuselage, a second radio signal transmitted from a horizon and/or below the aircraft, the second radio signal being propagated to the radio sensor through an electrically conductive portion of the exterior fuselage.

This method may also include one or more of the features now described.

The radio antenna may be a cavity-backed patch antenna.

The radio sensor may include an antenna array with radio sensor antennae arranged circumferentially about the radio antenna.

The radio antenna and radio sensor may be carried by a housing mounted to the exterior fuselage and may be in a resonant cavity in the housing.

The radio antenna and radio sensor may be carried by a housing mounted to the exterior fuselage, the housing including a first resonant cavity and a second resonant cavity. The radio antenna may be located in the first resonant cavity and the second resonant cavity. The radio sensor may be located in the first resonant cavity.

The radio sensor may include an antenna array with radio sensor antennae arranged circumferentially about the radio antenna and the method may also include performing beam forming of the antenna array.

The method may also include a housing mounted on the exterior fuselage and carrying the radio antenna and radio sensor in such a way that a field of view of the radio antenna is above the aircraft and a field of view of the radio sensor is to left and right sides and/or below the aircraft.

Another example of a device includes an antenna system having (a) an antenna housing that can be mounted on an exterior fuselage of an aircraft; (b) a cavity-backed patch antenna carried by the antenna housing that can communicate with radio devices within a field of view of the cavity-backed patch antenna when mounted on the exterior fuselage; and (c) a radio sensor carried by the antenna housing that can communicate with radio devices outside the field of view of the cavity-backed patch antenna through an electrically conductive portion of the exterior fuselage. The radio sensor includes an antenna array circumscribing the cavity-backed patch antenna.

This device may also include one or more of the features now described.

The cavity-backed patch antenna and radio sensor may be in a common resonant cavity in the antenna housing.

The antenna housing may include a first resonant cavity and a second resonant cavity. The cavity-backed patch antenna may be located in the first resonant cavity and the second resonant cavity. The radio sensor may be located in the first resonant cavity.

The device may also include an aircraft having the antenna housing mounted on the exterior fuselage thereof in such a way that the field of view of the cavity-backed patch antenna is above the aircraft and the field of view of the radio sensor is to left and right sides and/or below the aircraft.

The device may also include a signal conditioner that can perform beam forming of the antenna array.

DETAILED DESCRIPTION OF EXAMPLE EMBODIMENTS

This disclosure describes features and examples, but not all possible features and examples of the antenna system and methods. Where a particular feature is disclosed in the context of a particular example, that feature can also be used, to the extent possible, in combination with features from other examples and/or in the context of other examples. The antenna system and methods may be embodied in many different forms and should not be construed as limited to only the examples described here.

Figure 1:
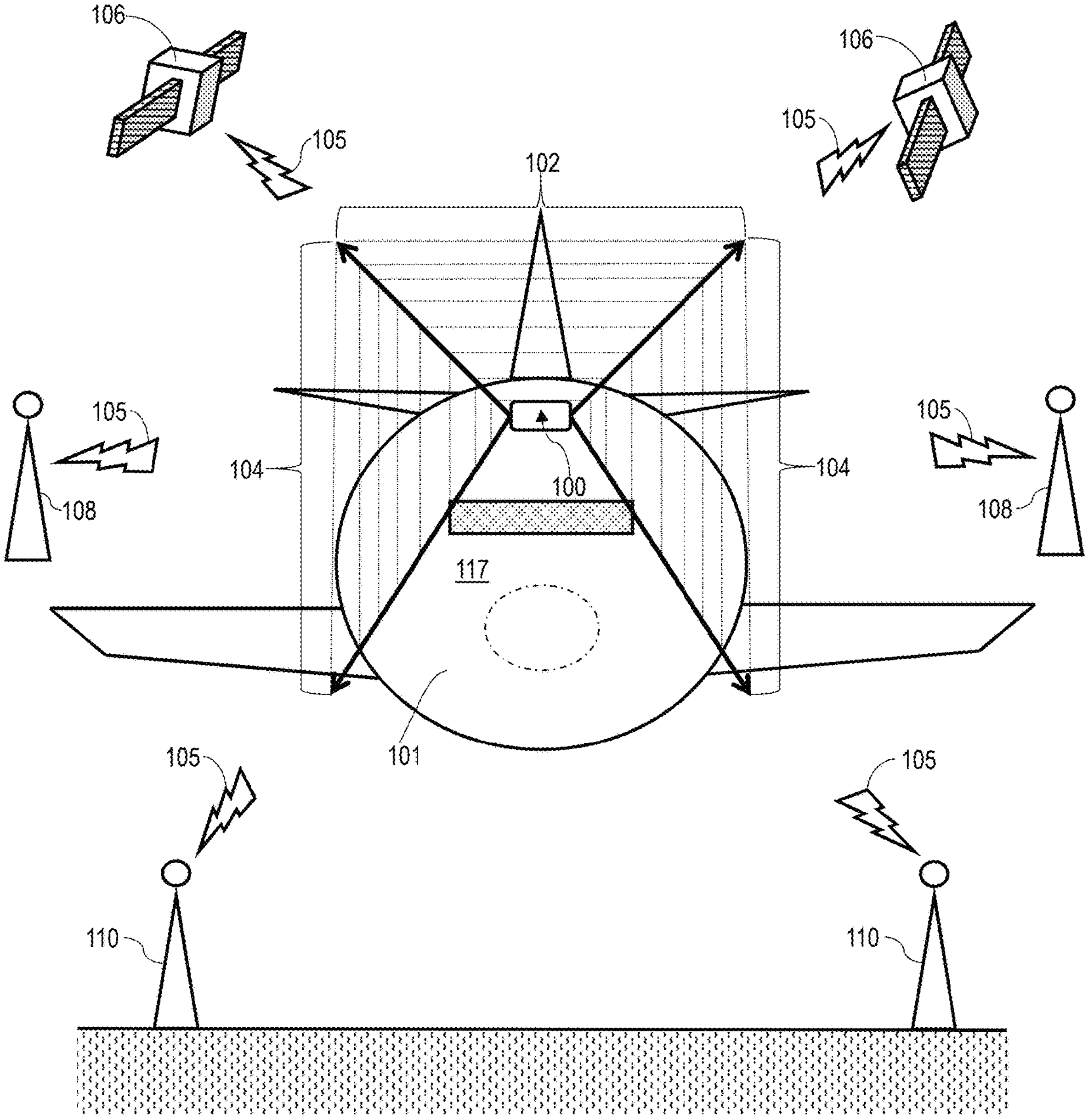
FIG. 1 is a schematic of an aircraft carrying the antenna system, which can communicate with radios in space, the horizon, and/or on Earth.

Referring to FIG. 1, the antenna system 100 is mountable on an aircraft exterior fuselage 101. When mounted atop the fuselage 101, as may sometimes be the case, the antenna system 100 has a first FoV 102 extending vertically from the antenna system 100 and a second FoV 104 extending horizontally and/or downwardly from the antenna system 100. The second FoV 104 allows the antenna system 100 to transmit and receive radio signals 105 from outside the first FoV 102. This arrangement allows the antenna system 100 to communicate with space-based radios 106, horizon-based radios 108, and/or Earth-based radios 110. A conventional top-mounted vertical FoV aircraft antenna cannot communicate with horizon-based radios 108 or Earth-based radios 110. The antenna system may be a conformal antenna system for aircraft communications.

Figure 2:
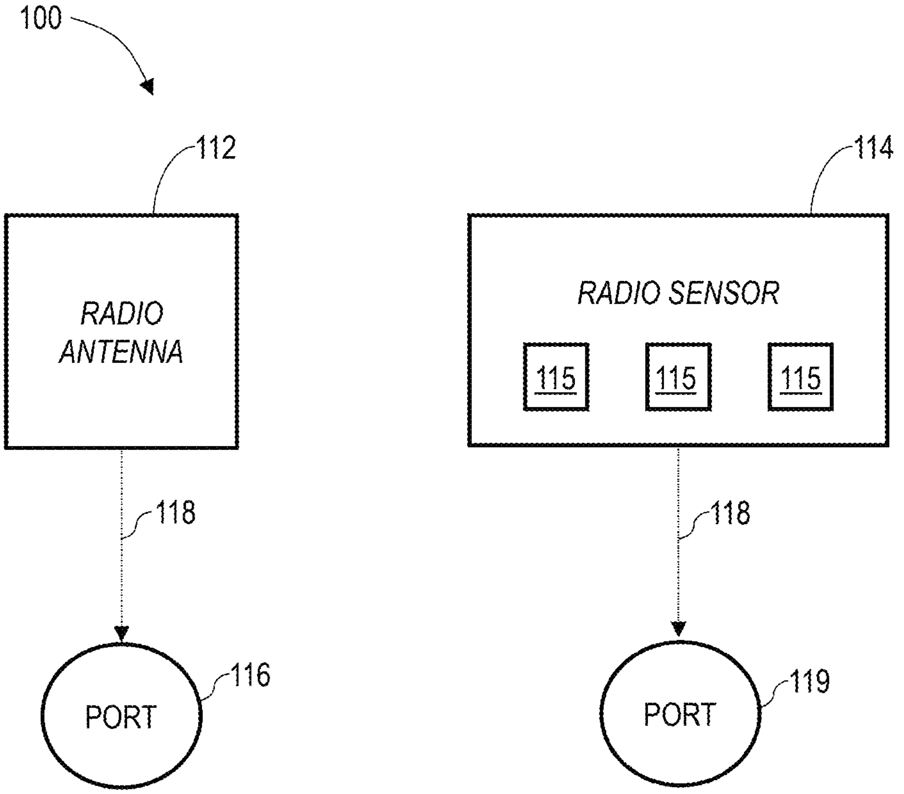
FIG. 2 is a block diagram of a first example of the antenna system.

Referring to FIG. 2, an example of the antenna system 100 includes a radio antenna 112 and a radio sensor 114. The radio antenna 112 has the first FoV in FIG. 1 whereas the radio sensor 114 has the second FoV in FIG. 1. The radio antenna 112 is wired to a first communications port 116 via RF circuitry 118. The radio sensor 114 is wired to a second communications port 119 via RF circuitry 118.

The RF circuitry 118 includes RF transmission lines such as coaxial cables, waveguides, or the like. The RF circuitry 118 may also include signal conditioning equipment such as filters, mixers, splitters, oscillators, modulators, attenuators, and the like. The respective communication ports 116, 119 are RF connectors that feed the signals from the respective RF circuitry 118 to the aircraft's radio system.

The radio antenna 112 may be any type of aircraft radio antenna, such as for example, those designed to have a vertical FoV. Examples of such an antenna include, but are not limited to, a cavity-backed patch antenna, a slot antenna, a cavity-backed Archimedean spiral antenna, a cavity-backed logarithmic spiral antenna, a cavity-backed bow tie antenna, a cavity-backed sinuous spiral antenna, or the like.

A patch antenna is a class of antenna with a flat profile designed to be mounted at a surface such as the outer skin of an aircraft. A patch antenna includes a patch of a metal conductor having a planar geometry adjacent another metal conductor functioning as a ground plane. The two metal conductors together form a resonant transmission line with a length of approximately one-half wavelength of the radio waves it transmits and receives. The patch antenna may be formed on a substrate such as a printed circuit board. The patch antenna may be adapted to transmit and receive radio waves of a desired polarization by selecting the appropriate metal conductor geometry. In some examples, the patch antenna is adapted to transmit and receive right or left hand circularly polarized radio waves because many radios located on satellites transmit right or left hand circularly polarized signals.

The radio sensor 114 may include a plurality of radio sensor antennae 115 arranged in a cooperating antenna array adjacent the radio antenna 112. The radio sensor antennae 115 may take the form of individual radio antennae, individual radio surface wave sensors, or the like. Such radio sensor antennae 115 may be able to transmit and receive radio signals that are propagated by the aircraft's conductive metallic fuselage skin. By being able to transmit and receive radio signals that are propagated by the aircraft's electrically conductive fuselage skin, the radio sensor 114 may increase the total FoV of the antenna system 100 to substantially 360 degrees. This permits the antenna system 100 to communicate with radios above the aircraft, on the horizon, or on Earth.

Figure 3:
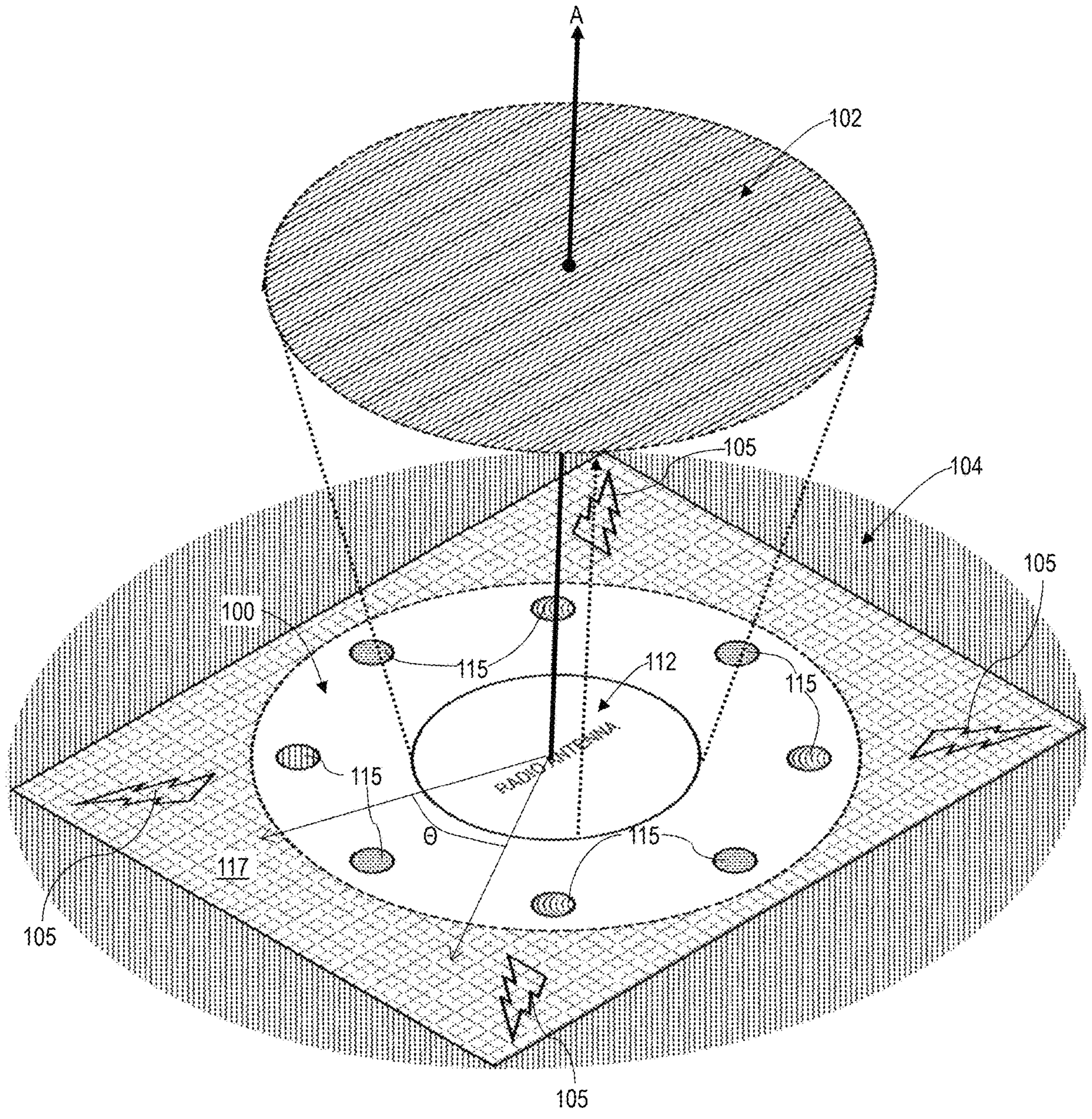
FIG. 3 is a top perspective view of a second example of the antenna system installed on an electrically conductive surface.

Referring to FIG. 3, an example of the antenna system 100 will be described in more detail. In this example of the antenna system 100 the radio antenna 112 positioned along a central axis A. The radio sensor is composed of a plurality radio sensor antennae 115 arranged circumferentially about the axis A and radio antenna 112. The first FoV 102 is illustrated as a cone extending vertically from the radio antenna 112. The radio sensor antennae 115 are substantially evenly spaced diametrically about the central axis A and are separated by an angle θ of about 45 degrees. In other examples, there may be more or fewer radio sensor antennae 115, in which case the angle θ will be selected so that the radio sensor antennae 115 circumscribe the axis by 360 degrees.

In this example, the antenna system 100 is being carried on an electrically conductive surface 117 such as the metallic skin of an aircraft fuselage. The electrically conductive surface 117 propagates radio signals 105 that have been transmitted from horizon-based and/or Earth-based radios. The radio sensor 114 detects the radio signals propagated by the electrically conductive surface 117. This function gives the radio sensor 114 a field of view that follows the conformal path of the electrically conductive surface 117. This permits the electrically conductive surface 117 to function similar to a low gain antenna in conjunction with the radio sensor 114.

Figure 4:
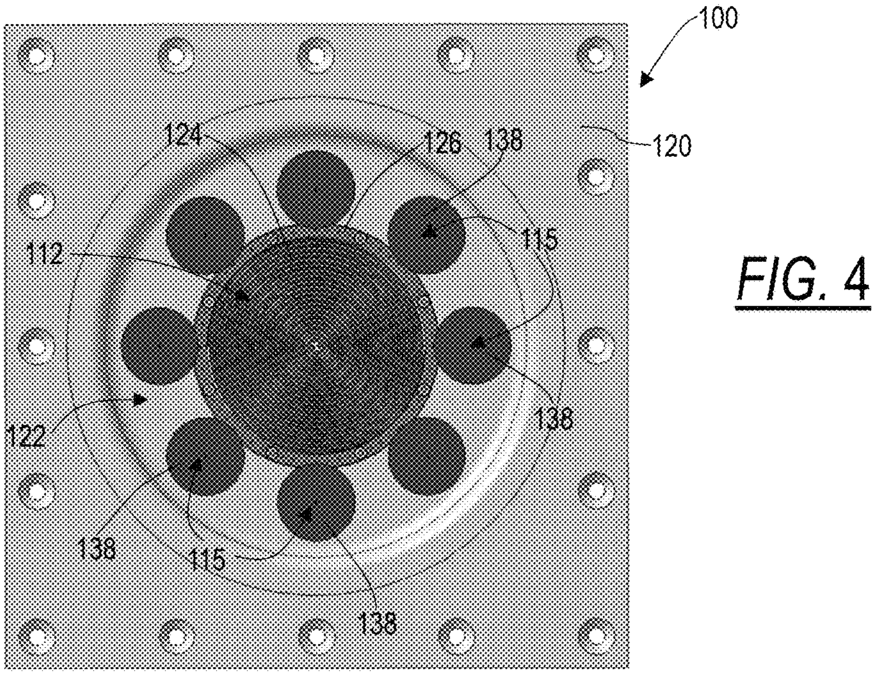
FIG. 4 is a top view of a third example of the antenna system.
Figure 5:
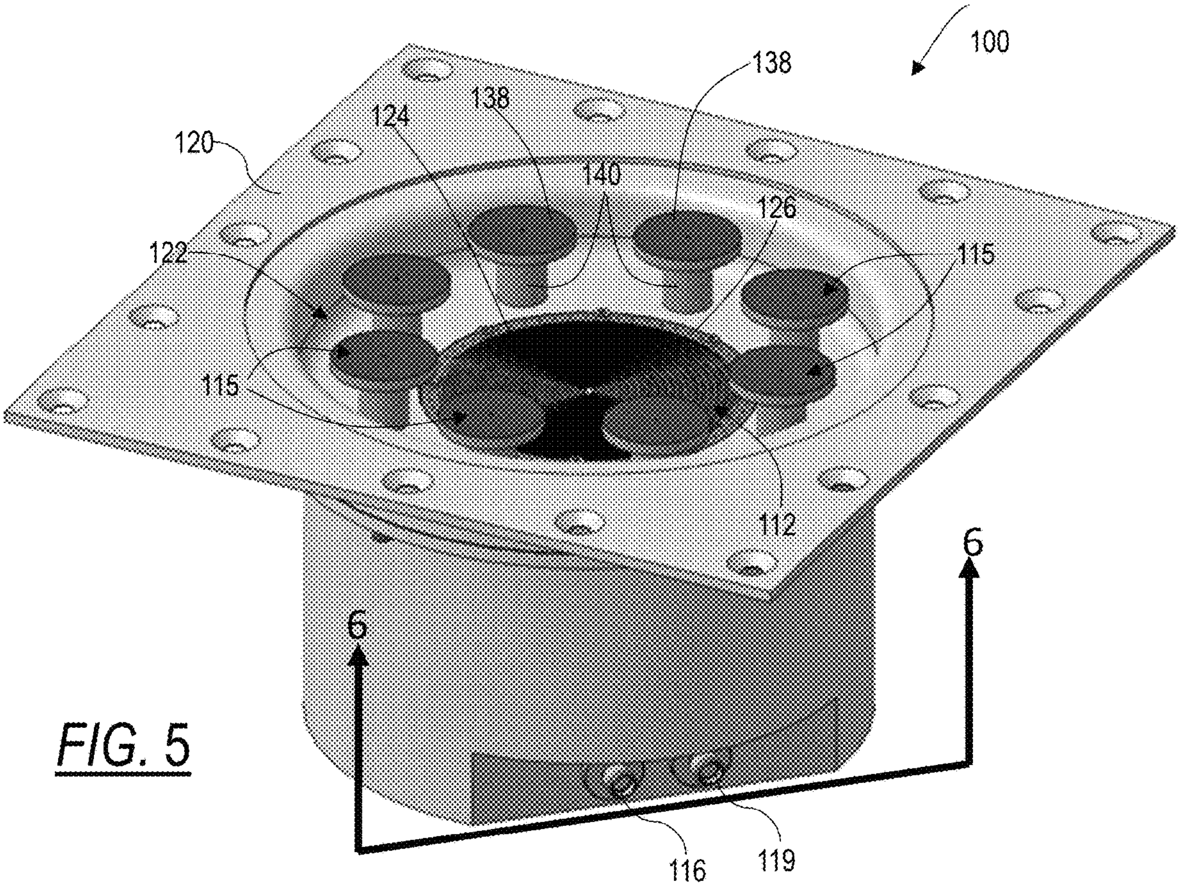
FIG. 5 is a top perspective view thereof.
Figure 6:
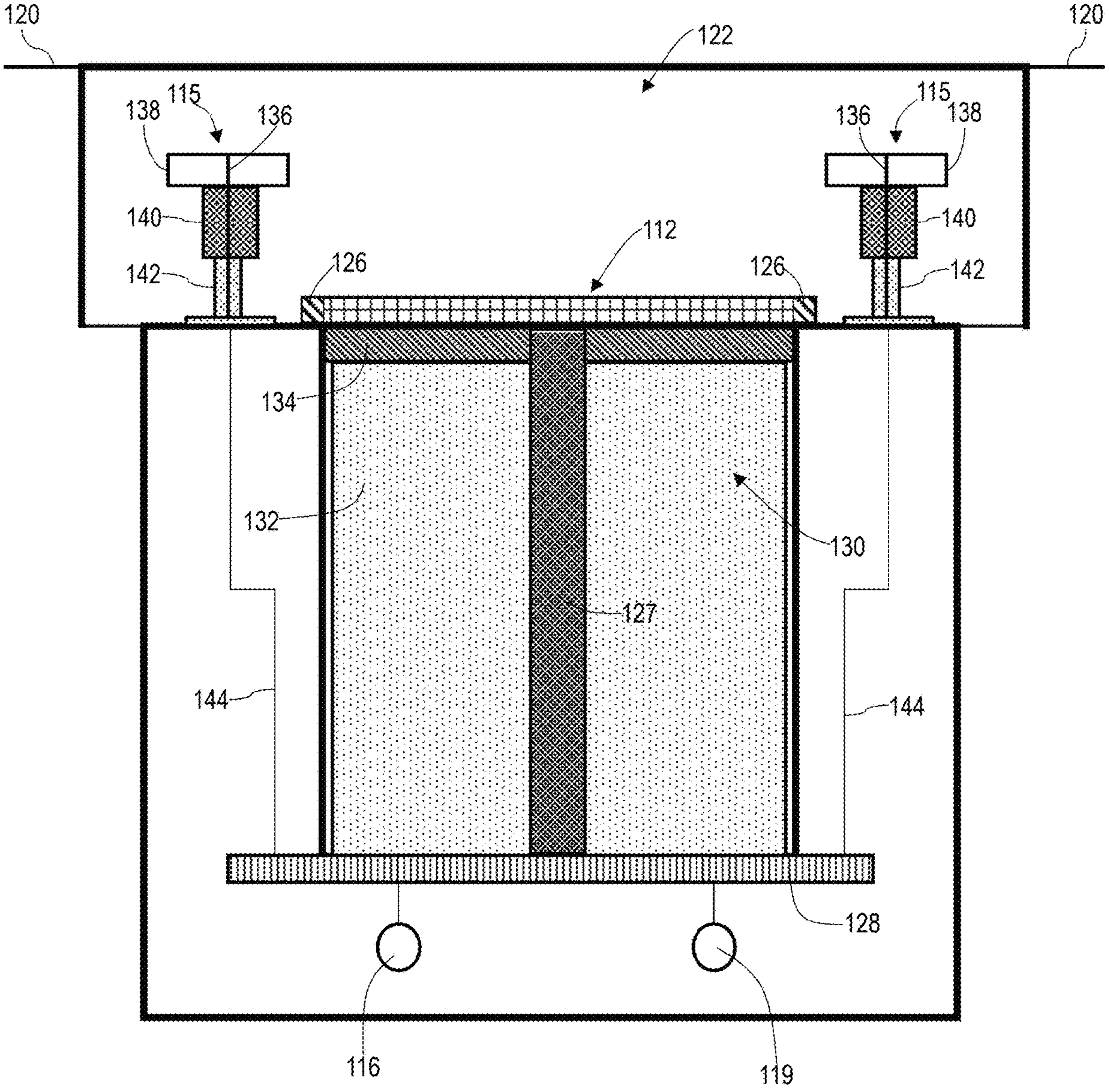
FIG. 6 is a sectional view thereof taken along plane 6-6 in FIG. 5.

Referring to FIGS. 4-6, a more detailed example of the antenna system 100 will be described. In this example, the antenna system 100 is mounted within an antenna housing 120 that is designed to secure the antenna system 100 to the aircraft. The antenna housing 120 may be mounted to the aircraft fuselage via a conventional mechanism for mounting devices to an aircraft exterior fuselage such as, for example, screws, bolts, and the like.

The antenna housing 120 defines a first resonant cavity 122 recessed therein. The radio antenna 112 and radio sensor antennae 115 are positioned in the first resonant cavity 122. The housing 120 may be made of electrically conductive material such as metal or the like. For aircraft applications, the antenna housing 120 is typically made of aluminum.

In this example, the radio antenna 112 is a patch antenna having a spiral conductive stripline 124 formed on a PCB substrate. A conductive ring 126 circumscribes the stripline 124. The PCB substrate is in electrical communication with an RF lead 127 extending into a second resonant cavity 130 to a circuit board 128. Inside the second resonant cavity 130 is an RF absorber 132 circumscribing the RF lead 127. An absorber spacer 134 is positioned between the RF absorber 132 and patch antenna 112.

In this example, the radio sensor antennae 115, respectively, include a conductive wire 136 capped by a top hat 138 and circumscribed by a tubular electrical insulator 140 positioned atop a standoff 142. A coaxial cable 144 connects the standoff 142 to a circuit board 128.

The circuit board 128 includes RF circuitry that transmits and receives signals from the radio antenna 112 and radio sensor 114. The circuit board 128 communicates with the aircraft's radio system through the first port 116 and second port 119.

The antenna system 100 is operational over many conventional radio communication frequencies including radio and microwave frequencies. The dimensions of the RF components that manipulate the RF characteristics of the antenna system 100 can change depending on the RF band over which the antenna system 100 is designed to transmit and receive. Examples of possible dimensions are reported below relative to the target transmit and receive wavelength (λ) of the antenna system 100.

Depth of first resonator cavity=0.5-0.05λ, 0.25-0.05λ, 0.2-0.05λ, or about 0.1λ

Inside diameter of first resonator cavity=1-0.1λ, 0.8-0.2λ, 0.7-0.5λ, or about 0.6λ

Depth of second resonator cavity=0.6-0.1λ, 0.4-0.1λ, or about 0.2λ

Inside diameter of second resonator cavity=0.8-0.1λ, 0.6-0.2λ, or about 0.4λ

Diameter of stripline=0.6-0.1λ, 0.4-0.2λ, or about 0.3λ

Width of conductive ring=0.1-0.1λ, 0.03-0.01λ, or about 0.02λ

Diameter of top hat=0.3-0.05λ, 0.2-0.05λ, or about 0.1λ

Length of conductive wire=0.3-0.05λ, 0.2-0.05λ, or about 0.1λ

Signals from the radio antenna 112 and radio sensor 114 may either be combined or isolated from one another, depending on the desired performance of the antenna system. If combined, the antenna system 100 can function as a two antenna array. If isolated from each other, their respective transmit and receive signals can be substantially independent from each other, aside from any undesired interference between the radio antenna 112 and radio sensor 114.

Figure 7:
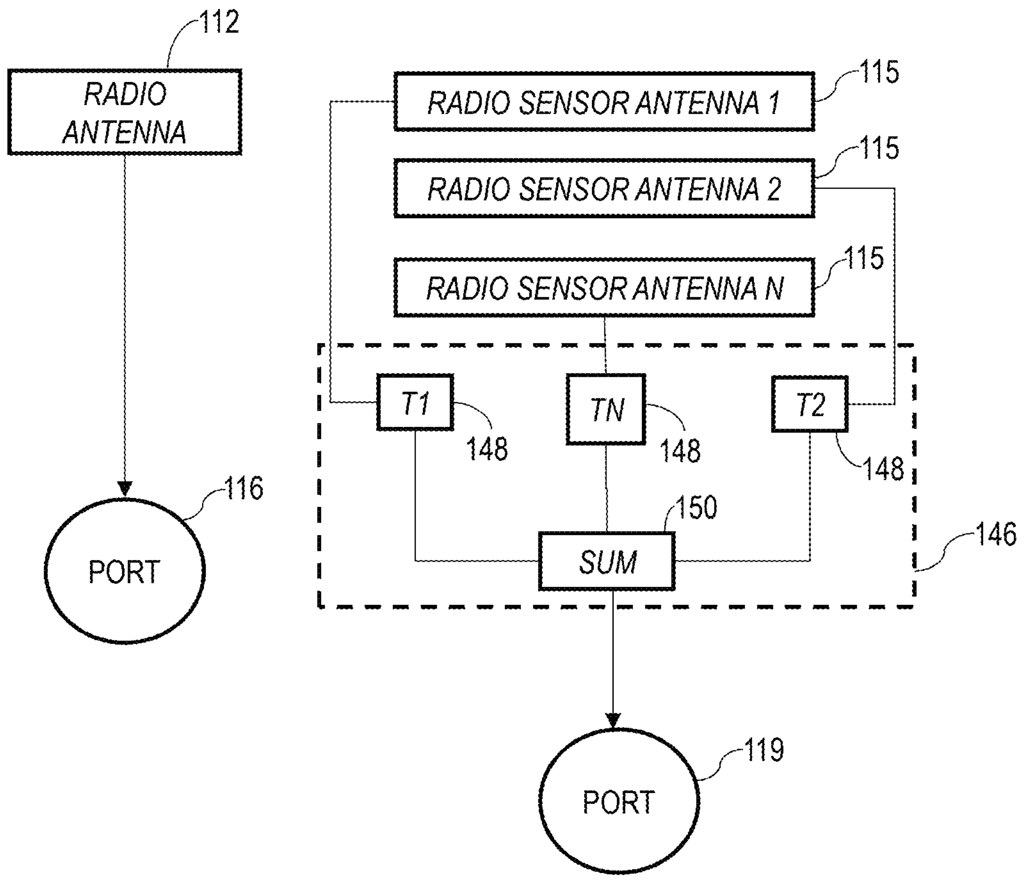
FIG. 7 is a block diagram illustrating a signal conditioning process.

Referring to FIG. 7, a signal conditioning process will be described. In this process, the radio antenna 112 communicates transmit and receive RF signals with the first port 116 and the radio sensor 114 communicate RF signals with the second port 119.

A signal conditioner 146 is positioned along the signal path between the second port 119 and radio sensor 114. The signal conditioner 146 includes RF circuitry that permits the signal from each of the N radio sensor antennae 115 to be conditioned using a transfer function 148. Here, N represents the total number of radio sensor antennae 115 in the array. Each transfer function 148 is controllable independently of the others and can be added together with a signal combiner 150.

By adjusting the individual transfer functions 148, a user can adjust the phase and magnitude of each radio sensor antenna 115 for applications such as beam forming, including null steering. For example, interference between radio signals in the horizontal FoV and the vertical FoV can be reduced by using the radio sensor 114 for null steering in such a way that the radio antenna 112 can transmit and receive radio signals in the vertical FoV without being negatively influenced by signals in the horizontal FoV.

The antenna system and methods are not limited to the details described in connection with the example embodiments. There are numerous variations and modification of the compositions and methods that may be made without departing from the scope of what is claimed.

That which is claimed is:

1. A device comprising an antenna system including:

(a) an antenna housing that can be mounted on an exterior fuselage of an aircraft;

(b) a radio antenna carried by the antenna housing that can communicate with radio devices within a field of view of the radio antenna when mounted on the exterior fuselage; and (c) a radio sensor carried by the antenna housing that can communicate with radio devices outside the field of view of the radio antenna through an electrically conductive portion of the exterior fuselage.

2. The device of claim 1, wherein the radio antenna is a cavity-backed patch antenna.

3. The device of claim 1, wherein the radio sensor includes an antenna array with radio sensor antennae arranged circumferentially about the radio antenna.

4. The device of claim 1, wherein the radio antenna and radio sensor are in a common resonant cavity in the antenna housing.

5. The device of claim 1, wherein:

the antenna housing includes a first resonant cavity and a second resonant cavity;

the radio antenna is located in the first resonant cavity and the second resonant cavity; and the radio sensor is located in the first resonant cavity.

6. The device of claim 1, further comprising an aircraft having the antenna housing mounted on the exterior fuselage thereof in such a way that the field of view of the radio antenna is above the aircraft and the field of view of the radio sensor is to left and right sides and/or below the aircraft.

7. The device of claim 1, wherein the radio sensor includes an antenna array with radio sensor antennae arranged circumferentially about the radio antenna and the device further comprises a signal conditioner that can perform beam forming and null steering of the antenna array.

8. A method comprising:

receiving, by a radio antenna on an exterior fuselage of an aircraft, a first radio signal transmitted from above the aircraft; and receiving, by a radio sensor adjacent the radio antenna on the exterior fuselage, a second radio signal transmitted from a horizon and/or below the aircraft, the second radio signal being propagated to the radio sensor through an electrically conductive portion of the exterior fuselage.

9. The method of claim 8, wherein the radio antenna is a cavity-backed patch antenna.

10. The method of claim 8, wherein the radio sensor includes an antenna array with radio sensor antennae arranged circumferentially about the radio antenna.

11. The method of claim 8, wherein the radio antenna and radio sensor are carried by a housing mounted to the exterior fuselage and are in a resonant cavity in the housing.

12. The method of claim 8, wherein:

the radio antenna and radio sensor are carried by a housing mounted to the exterior fuselage, the housing including a first resonant cavity and a second resonant cavity;

the radio antenna is located in the first resonant cavity and the second resonant cavity; and the radio sensor is located in the first resonant cavity.

13. The method of claim 8, wherein the radio sensor includes an antenna array with radio sensor antennae arranged circumferentially about the radio antenna and the method further comprises a performing beam forming and null steering of the antenna array.

14. The method of claim 8, further comprising a housing mounted on the exterior fuselage and carrying the radio antenna and radio sensor in such a way that a field of view of the radio antenna is above the aircraft and a field of view of the radio sensor is to left and right sides and/or below the aircraft.

15. A device comprising:

an antenna system including:

(a) an antenna housing that can be mounted on an exterior fuselage of an aircraft;

(b) a cavity-backed patch antenna carried by the antenna housing that can communicate with radio devices within a field of view of the cavity-backed patch antenna when mounted on the exterior fuselage; and (c) a radio sensor carried by the antenna housing that can communicate with radio devices outside the field of view of the cavity-backed patch antenna through an electrically conductive portion of the exterior fuselage, the radio sensor including an antenna array circumscribing the cavity-backed patch antenna.

16. The device of claim 15, wherein the cavity-backed patch antenna and radio sensor are in a common resonant cavity in the antenna housing.

17. The device of claim 15, wherein:

the antenna housing includes a first resonant cavity and a second resonant cavity;

the cavity-backed patch antenna is located in the first resonant cavity and the second resonant cavity; and the radio sensor is located in the first resonant cavity.

18. The device of claim 15, further comprising an aircraft having the antenna housing mounted on the exterior fuselage thereof in such a way that the field of view of the cavity-backed patch antenna is above the aircraft and the field of view of the radio sensor is to left and right sides and/or below the aircraft.

19. The device of claim 15, further comprising a signal conditioner that can perform beam forming of the antenna array.

* * * * *